United States Patent
Lapidous

(10) Patent No.: US 8,191,117 B2
(45) Date of Patent: May 29, 2012

(54) LOCATION-TARGETED ONLINE SERVICES

(75) Inventor: Eugene Lapidous, Saratoga, CA (US)

(73) Assignee: AnchorFree, Inc., Mountain View, CA (US)

( * ) Notice: Subject to any disclaimer, the term of this patent is extended or adjusted under 35 U.S.C. 154(b) by 813 days.

(21) Appl. No.: 12/259,147

(22) Filed: Oct. 27, 2008

(65) Prior Publication Data

US 2009/0113532 A1     Apr. 30, 2009

Related U.S. Application Data

(60) Provisional application No. 60/982,706, filed on Oct. 25, 2007.

(51) Int. Cl.
*G06F 17/30*     (2006.01)
(52) U.S. Cl. .......................................... 726/4; 713/189
(58) Field of Classification Search ....................... 726/4
See application file for complete search history.

(56) References Cited

U.S. PATENT DOCUMENTS

| | | | |
|---|---|---|---|
| 2004/0117493 A1* | 6/2004 | Bazot et al. | 709/229 |
| 2006/0288213 A1* | 12/2006 | Gasparini et al. | 713/170 |
| 2009/0083184 A1* | 3/2009 | Eisen | 705/50 |

* cited by examiner

*Primary Examiner* — Thuong Nguyen
*Assistant Examiner* — Arvin Eskandarnia
(74) *Attorney, Agent, or Firm* — Haynes and Boone, LLP; Pavel I. Pogodin

(57) ABSTRACT

Described are various implementations of location-targeted online services. When a user accesses the Internet from a supported location, he'll be able to use premium or exclusive online services (premium content, member-only discounts etc.) for free and without going through an elaborate subscription process. The location owner may promote these services before the user enters the location. Example: in addition to mentioning "free Internet", the hotel owner can attract new customers by mentioning "free Netflix movies" or "free access to premium content, from Zagat reviews to stock reports". It allows the location owner to utilize a network (WIFI) service provider as a means of increasing its core business and not just as a source of incremental advertisement income.

19 Claims, 11 Drawing Sheets

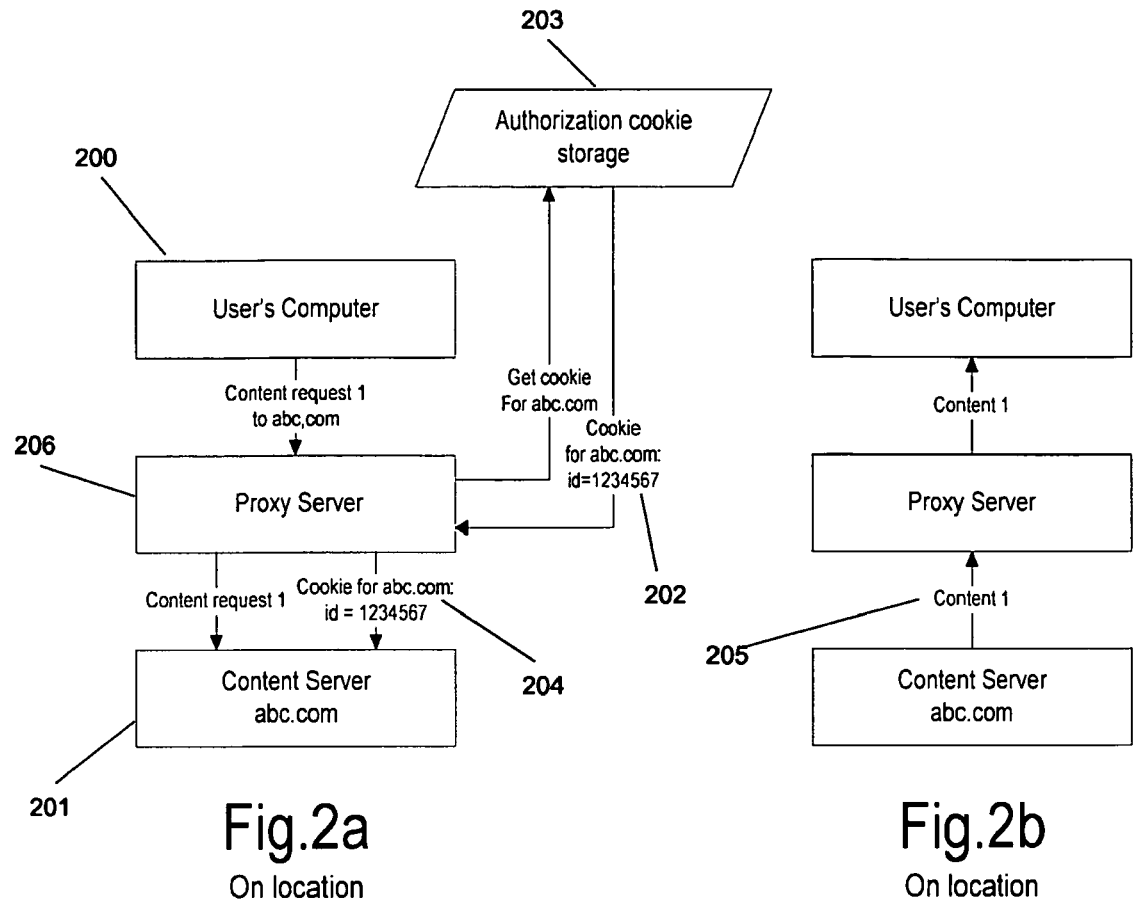
Fig.2a
On location
Fig.2b
On location
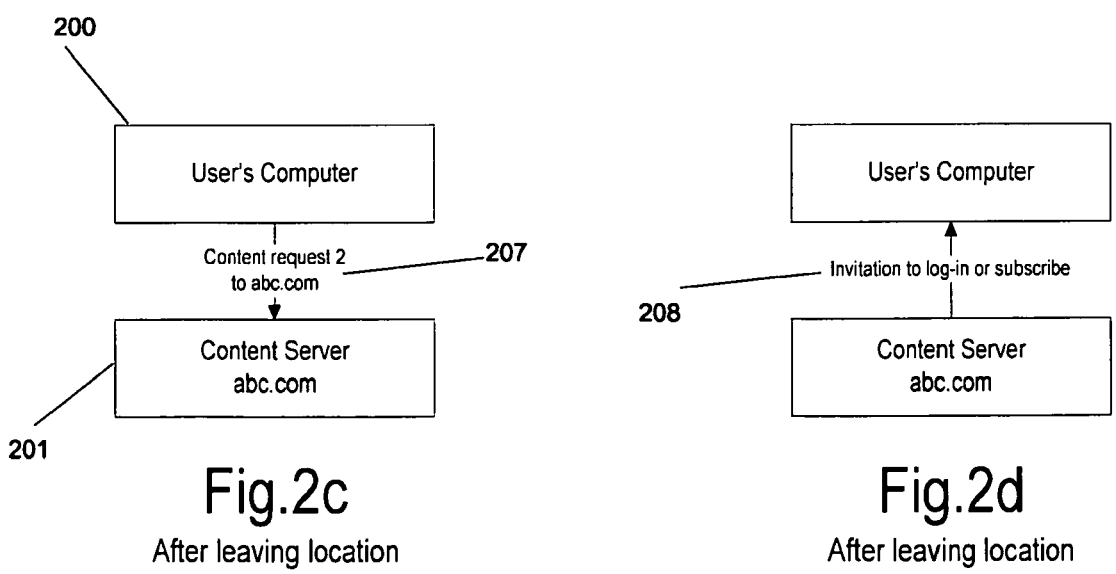
Fig.2c
After leaving location
Fig.2d
After leaving location On location On location On location On location After leaving location After leaving location On location On location On location On location After leaving location After leaving location

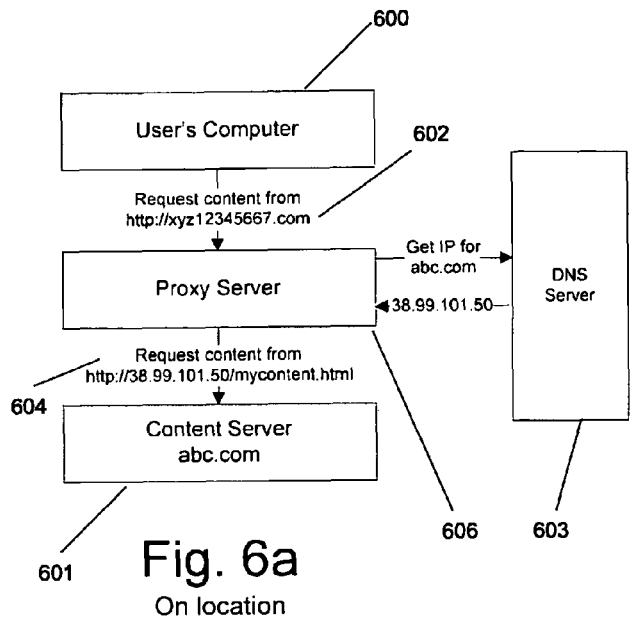
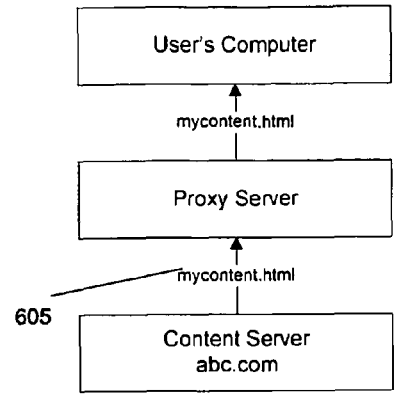
Fig. 6a
On location
Fig. 6b
On location
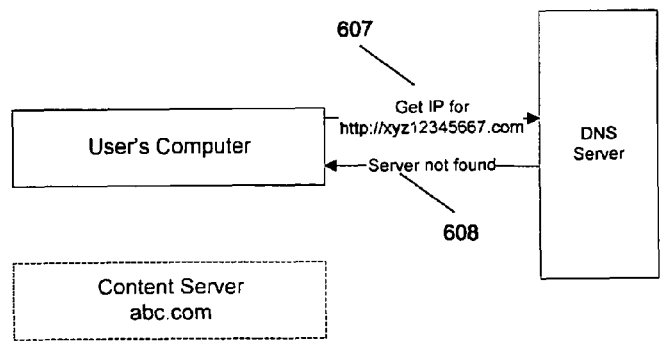
Fig. 6c
Off location

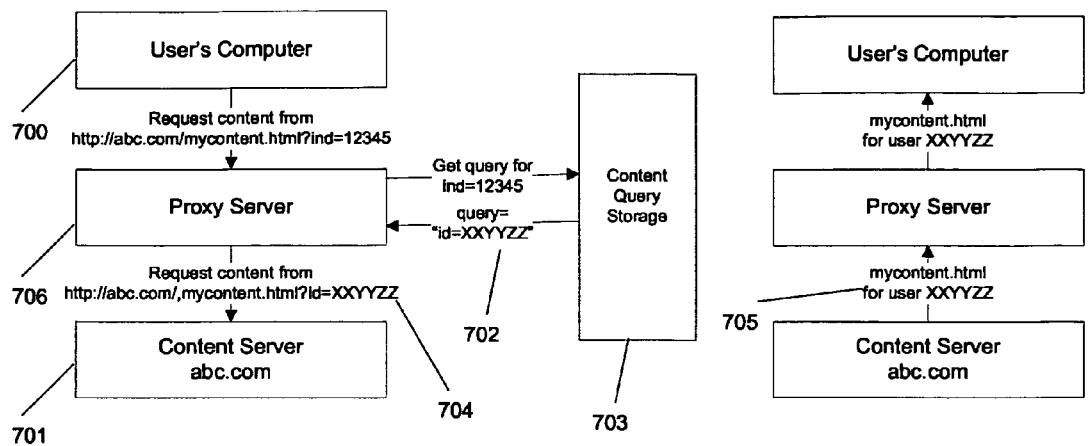
Fig. 7a
On location
Fig. 7b
On location
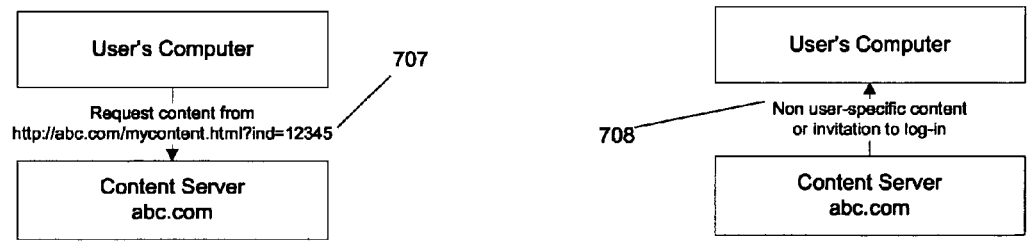
Fig. 7c
Off location
Fig. 7d
Off location Before entering location On location On location After leaving location

LOCATION-TARGETED ONLINE SERVICES

CROSS-REFERENCE TO RELATED APPLICATION

This regular U.S. patent application is based on and claims the benefit of priority under 35 U.S.C. 119 from provisional U.S. patent application No. 60/982,706, filed on Oct. 25, 2007, the entire disclosure of which is incorporated by reference herein.

FIELD OF THE INVENTION

The present invention generally relates to internet technology and, more specifically, to providing various services to customers over a computer network.

DESCRIPTION OF THE RELATED ART

Web sites and services requiring users to pay for the content severely limit the user base. Sites utilizing free trials and limited-time offers still attract fewer users than sites with completely free content. However, converting from a paid content model to a free content model is risky since traffic may not grow fast enough to generate comparable ad revenue.

The same problem also applies to member-only discount clubs (cruise discounts, etc.), which use exclusivity to justify their special pricing; any access limitation drastically decreases the user base.

Thus, there is currently no existing conventional methodology which allows premium web sites and services to expand their user base without completely switching to free content. Furthermore, there is currently no existing technology which allows member-only sites and services to expand their user base without completely dropping subscription requirements.

SUMMARY OF THE INVENTION

The inventive methodology is directed to methods and systems that substantially obviate one or more of the above and other problems associated with conventional techniques for providing services to customers over a computer network.

One aspect of the inventive concept is a system, method and computer-readable medium for providing location-targeted online services.

Additional aspects of the inventive concept include a system for accessing premium content, which includes a user computer initiating a request for premium content, a proxy server operable to obtain an authorization cookie, append the authorization cookie to the request for premium content and forward the request for premium content, and a content server receiving the forwarded request and returning premium content upon detecting the appended authorization cookie.

Additional aspects of the inventive concept include a system for accessing premium content, which includes a user computer initiating a request for premium content, said request containing first cookie, said cookie being different from the authorization cookie required to retrieve requested content, a proxy server operable to modify first cookie to produce the authorization cookie, append the authorization cookie to the request for premium content and forward the request for premium content, and a content server receiving the forwarded request and returning premium content upon detecting the appended authorization cookie.

Additional aspects of the inventive concept include a system for accessing premium content, which includes a user computer initiating a request for premium content which is redirected to a partner web service, wherein the partner web service modifies request for premium content by using a modified URL link, a content server comprising premium content, and a proxy server which operates to process the modified URL link into a URL link associated with the content server, redirect the user computer to the content server and retrieve premium content.

Additional aspects of the inventive concept include a system for accessing premium content, which includes a user computer initiating a request for premium content, said request containing first universal resource locator (URL) comprising host portion and a query portion, the host portion being the same as the host portion of URL of the content server, and a proxy server which operates to modify the query portion of the first URL, append modified query portion to the host portion of the first URL to produce second URL addressing the requested premium content, request the premium content referenced by the second URL and retrieve premium content.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the inventive technique. Specifically:

FIGS. 1a-1f show the prior art sign-in process, wherein the requested content is supplied only after the user enters their name and password. Subsequent content during the same session is authorized if the user computer contains a cookie stored during sign-in.

FIGS. 2a-2d show an implementation of the inventive concept, where a proxy server obtains an authorization cookie from storage, and then appends it to the user's request (2a) to obtain the first content without sign-in (2b).

FIGS. 6a-6c depict such an implementation, where the link on the user's computer references a URL with an encrypted combination of a host name and a content path.

FIGS. 7a-7d depict an embodiment where the link stored on user's computer contains the correct content path, with only the query portion of the URL hidden (references remote storage).

DETAILED DESCRIPTION

Figure 1A:
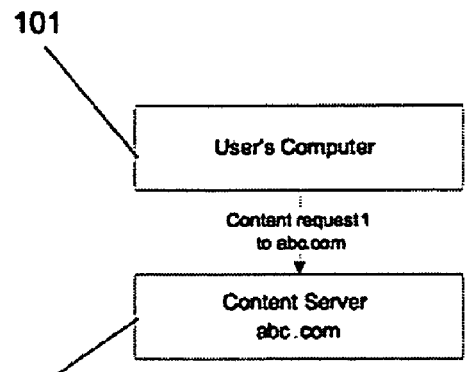
Figure 1B:
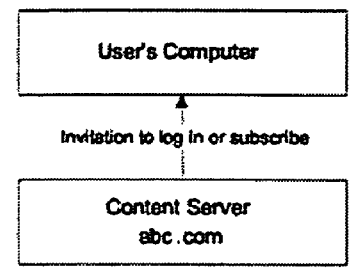
Figure 1C:
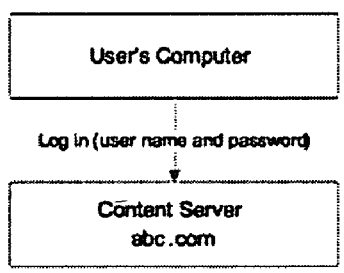
Figure 1D:
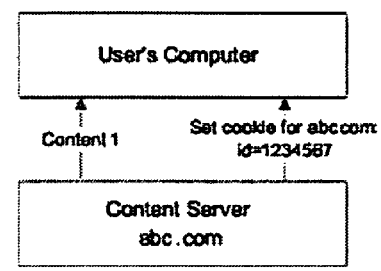
Figure 1E:
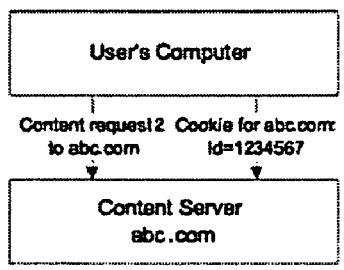
Figure 1F:
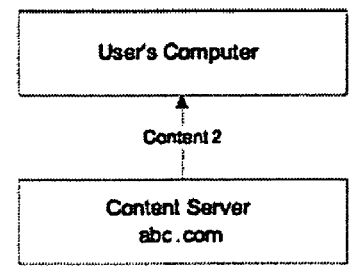

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

A location owner may not be interested in the relatively low income generated from Internet advertising. For example, a coffee shop owner with ~100 ad views/day may generate revenue of $7.5/month at $5 CPM, at a 50% revenue share. A hotel with ~3000 ad views/day: may generate revenue of $225.month at $5 CPM, at a 50% revenue share, which is less than the price of Internet access in a single room if the hotel charges $10/day.

Thus, it would be desirable to use a location-based service to attract new customers to location's core business.

On the other hand, users feel that paid Internet services should not carry additional advertisements. Thus, if hotel charges each user $10/day for internet access, users may accept a small hotel toolbar on every page, but not full-size ad banners. Thus, it would be desirable to justify the display of additional 3rd-party offers on locations with paid Internet access.

Moreover, multiple WiFi networks may cover the same location. For example, Union Square in San Francisco is already covered by multiple WiFi networks; some of them displaying content without additional ads. If a flat-rate paid nation-wide 3G or WiMax becomes ubiquitous (for instance, users drop land-based access and keep only WiMax), the user would not have an incentive to use local WiFi networks with advertisements. Thus, it would be desirable to provide an incentive to use a WIFI service, even if other means of Internet access are available at the same location.

The future WiMax network blurs location targeting. WiMax covers up to 20 miles, which makes it difficult to target separate businesses, even if free WiMax uses an ad insertion mechanism. If free WiMax is available in the area, the user would not have an incentive to use local WiFi networks with advertisements. Thus, it would be desirable to provide incentive to use small-range WiFi when free WiMax is available at the same location.

Various Embodiments of Inventive Concept

One embodiment of the inventive methodology enables location-targeted online services. When a user accesses the Internet from a supported location, he'll be able to use premium or exclusive online services (premium content, member-only discounts etc.) for free without going through elaborate subscription process.

The location owner may promote these services before the user enters the location. For example, in addition to mentioning "free Internet access", the hotel owner can attract new customers by mentioning "free Netflix movies" or "free access to premium content, from Zagat reviews to stock reports". It allows the location owner to utilize a service provider (such as WIFI or other network service provider) as means of increasing its core business and not just as a source of incremental advertisement income.

Offered services will also be promoted on the supported location as advertisements appearing during web browsing on the entry page. Because such promotions remind the user of pre-announced exclusive benefits, the user may accept additional advertisements even while paying for Internet access.

If the same location is covered by multiple networks (hotel LAN, muni WiFi, Sprint WiMax etc.), the user will be reminded to choose a network-provider-supported network to enable the exclusive location-targeted services. For instance, the WiFi network may be named "BedBreakfastAndFree-Movies" or "OnlineTravelDiscounts".

Even if free WiMax is available in the same area, the user will still benefit from using the location-targeted WiFi services (for instance, bookstore offering free online access to member-only reference materials and e-books).

After the user starts accessing the premium content or the member-only services, the service provider will show a reminder that this benefit will end when user leaves the location. To keep the access, the user will have to start paying for services, or formally enroll into the trial period, or submit personal info to qualify for a free subscription. In this way, the service provider will provide premium content services with a way to recruit new users who are already familiar with the product.

Free access to a location-targeted service will be automatically disabled after user leaves the service provider's network. The user will be able to continue accessing the same service only if he starts paying or becomes a member. This automatic disconnection from the service is another aspect of the inventive methodology.

Optionally, free access to the same premium service can be automatically re-enabled as soon as user enters the same or related location supported by the service provider. The premium service will recognize repeat customers and preserve their preferences, but only while these customers are at supported locations.

In one example of a location-targeted service: customer at the hotel automatically gets access to free movie streaming, as if he is already enrolled into the trial period.

In another example of a location-targeted service: while staying in the hotel, the customer automatically gets access to premium online content, at least for publications that are already distributed for free in the printed form (for instance Wall Street Journal is available in most hotels for free, but online content is not). Other content providers may not require a subscription fee, but still require the customers to register. The service provider can provide automatic log on while customer is on location.

In another example, the location-targeted service is a subscription-based restaurant review, such as Zagat, or a restaurant reservation service. In this and other examples of the location-targeted service: customer in the hotel is automatically recognized as a member with access to member-only content.

In one other example, the location-targeted service provides premium investment information provided by market research or brokerage firm such as ShortSqueeze, Forrester Research, Schwab, or SmartMoney—limited-distribution stock recommendations, premium stock analysis, member-only real estate information etc. In yet another example, the location-targeted services provides member-only discount club (SmartCruises, etc.) without the need for user login to access member-only content.

To advertise the location-targeted service, large hotels may advertise online; motel chains may show posters on premises: instead of "Free Internet", it may say "Free Internet, free movies".

In another example, location-targeted services provide free trial subscription to audiobooks, or premium reference services, or online libraries, The location-targeted service may also be deployed in a shopping mall to provide users with free and easy access to subscription-only online product reviews and ratings (Consumer Reports, CheckBook, Angie's List etc.), allowing the customer to check product ratings while inside the mall without going through subscription process.

Location-targeted services may also provide free subscription to a music service (Napster, Rhapsody, Virgin etc.) for users in a coffee shop, or free trial subscriptions to online movies from Netflix or Blockbuster.

Support for location-targeted services should include most of following features:
  easy activation of the targeted member-only service, preferably without forcing the user to provide any information to become a member (users outside the location will have to subscribe as usual).
  automatic recognition of the same user during multiple sessions at the same location.
  a reliable way to automatically disconnect access to the member-only service outside the location, unless user deliberately requests to continue the service.
  automatic recognition of the same user upon re-entering the location with targeted service.

To support these features without an intermediary such as a service provider, requests from a location network must be authenticated by a location-targeted service. This would require changes on both sides of the exchange, making location-targeted services impractical for both large vendors with change-resistant infrastructure and for small vendors that don't use strong authentication.

The WIFI service provider, serving as the "man-in-the-middle" for any transaction between the location and location-targeted service, will seamlessly modify traffic between both parties to provide all the listed features without requiring any additional support.

As soon as customer leaves the service provider's network, these real-time modifications will disappear, automatically disabling targeted services even if the user continues the same browsing session.

In this way, the service provider makes location-targeted services transparent for both location and online service, eliminating barriers to their deployment Demonstration of the advantages of location-targeted service may compare the experience with and without directing traffic through the service provider's proxy server. The latter is equivalent to an experience on the targeted location, where all traffic is redirected through either a local or a remote service provider's proxy.

Alternatively, instead of changing proxy on the browser, the on-site demo may switch between 2 different networks: one that supports location-targeted service, another that does not.

Example of such a demonstration may include the following steps:
  1. Default (proxy disabled):
    user tries to access premium service (Netflix, ShortSqueeze etc.): not recognized and thus must sign-in or enroll as new user.
  2. New location-targeted service technology (same browser session, enable proxy):
    advertisement on a current site offers one-click access to the service ("no sign-in needed while you are at this location")
    user clicks on the ad and gets full access to the service without log-in
    while service is used, advertisement offers to sign up to continue after leaving the location
  3. Default again (same browser session, disable proxy):
    user tries to continue with the service, but is requested to log in or sign in as a new user.
  4. New location-targeted service technology again, (same browser session, enable proxy):
    on seeing the ad offering one-click access, user bookmarks the link, in order to use the service after leaving the location
  5. Default again (same browser session, disable proxy):
    user selects the bookmark, but sees only the offer to sign in.
  6. New location-targeted service technology again (same browser session, enable proxy):
    user selects same bookmark and gets full access to the service without the log in.

One embodiment of targeted services comprises a location-specific membership: Different requirements to become a member, depending on the location where the online service is accessed, or depending on the access network.

In normal mode, the user must enter some information to enroll (select user name, select password, in some cases enter additional information such as email address, age, gender, interests etc.).

FIGS. 1a-1f shows the prior art sign-in process, where first requested content is supplied from the content server 102 only after user enters name and password; subsequent content during the same session is authorized if the user computer 101 contains a cookie stored during sign-in.

In the present invention, the barrier to enroll is lowered on the targeted location or on the targeted WiFi network: a first-time user can access the service just by clicking on its link (bypassing enrollment or sign in), or the user name and password are already provided for easy sign-in, or the user must enroll but isn't required to provide extensive personal information.

In this way, targeted service may incrementally extend its user base, without dropping membership or payment requirements for all users.

In one implementation, location-specific membership works only while the user is at the targeted location. Upon leaving it, the user must perform additional steps (submit additional information, start paying etc.) to continue using the service.

Alternatively, a location-specific membership continues to work after the user leaves the location. The content provider may require additional steps (for instance, payment) after the trial period expires, but will not force the user to submit additional information just to continue trial period.

The same content provider may utilize different ways to extend location-specific memberships for different users leaving targeted location, and then select the method producing the best results.

In the described implementation, a location-specific membership depends on the availability of the proxy server for forwarding requests and responses between the user's computer and content servers. Such a proxy may, for instance, reside on a wireless router at the targeted location, or on a remote server used to redirect HTTP traffic from the local network at the hotel.

FIGS. 2a-2d show an implementation where the proxy server 206 obtains an authorization cookie 202 from storage 203, and then appends it to the user's request 204 to obtain first content without sign-in 205. If the user computer 200 issues the next request 207 to the same content server 201 after leaving the location, there is no proxy server to add the authorization cookie, and the user request is redirected to the invitation to sign in 208.

Figure 3:
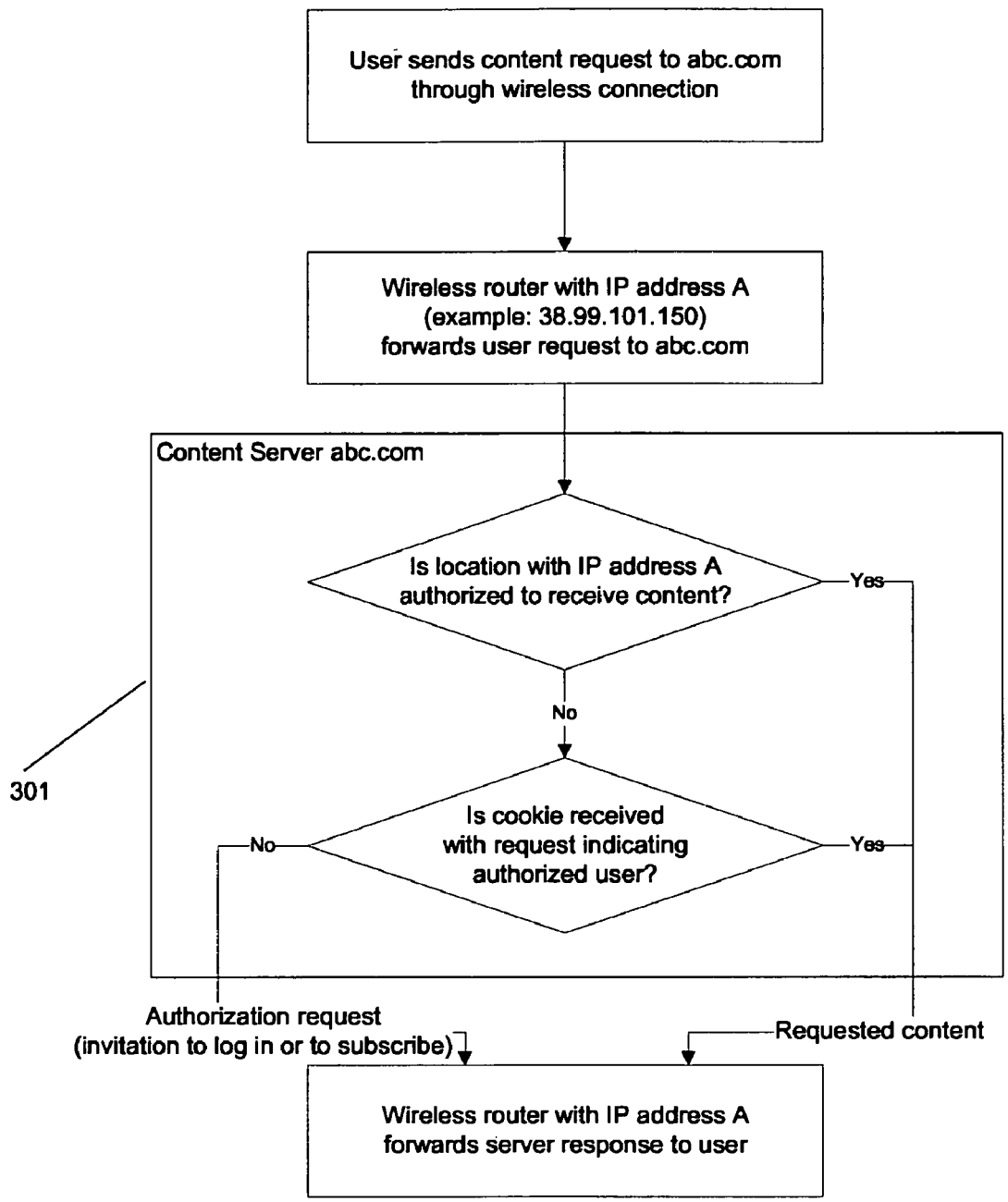
FIG. 3 illustrates an implementation of the inventive concept, characterized by identifying the user by the originating IP address.
Figure 4A:
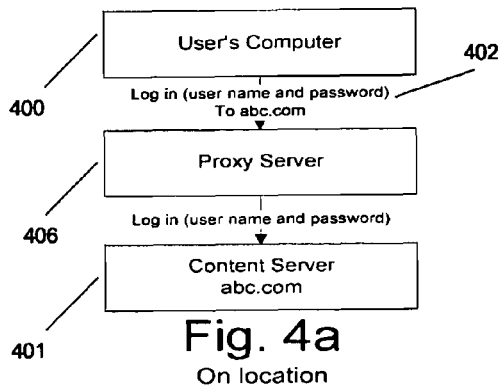
FIGS. 4a-4f show one embodiment, where the user logs in (4a), causing the server to set an authorization cookie, encrypted by a proxy server and stored on user's computer (4b).
Figure 4B:
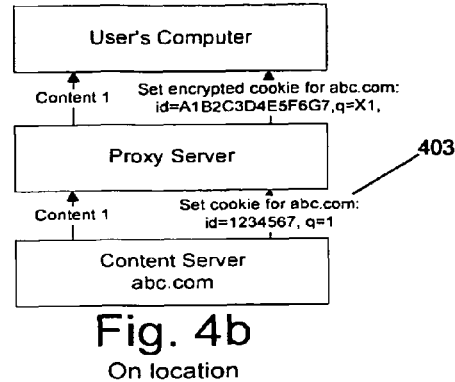
Figure 4C:
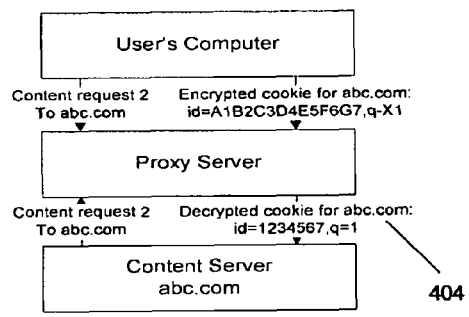
Figure 4D:
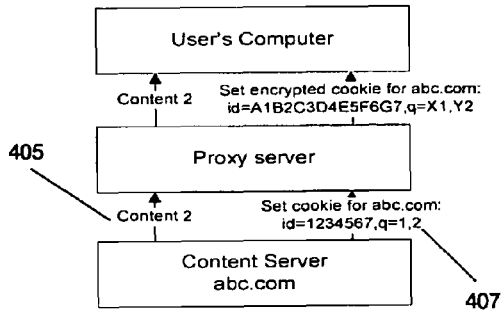
Figure 4E:
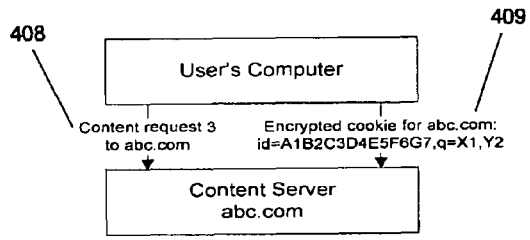
Figure 4F:
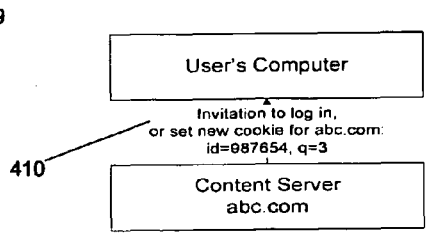
Figure 5A:
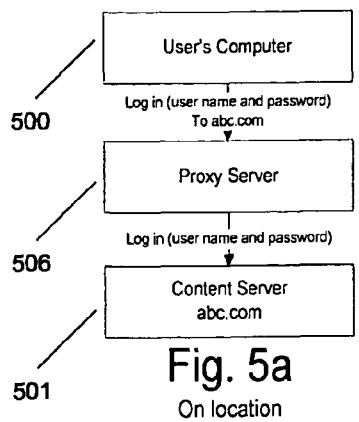
FIGS. 5a-5f show another embodiment, where a cookie supplied by the content server is stored separately (for instance, on the remote server), while only an index referencing that storage is sent to the user's computer (5b).
Figure 5B:
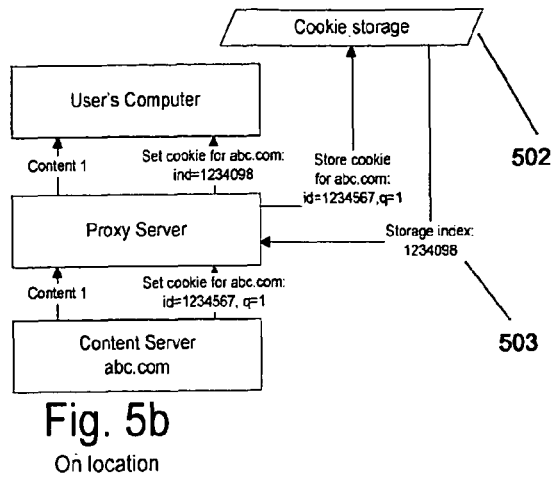
Figure 5C:
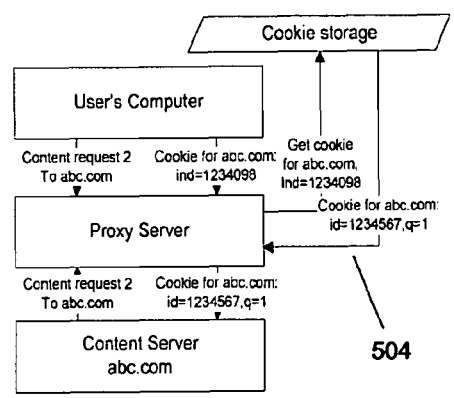
Figure 5D:
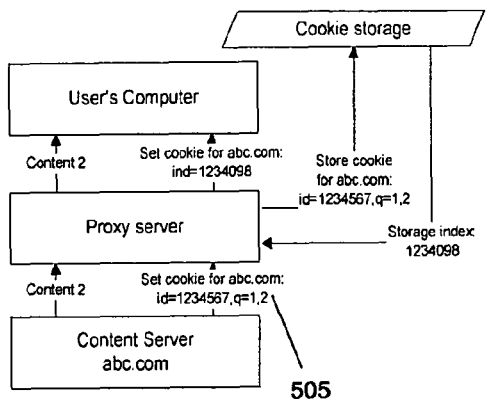
Figure 5E:
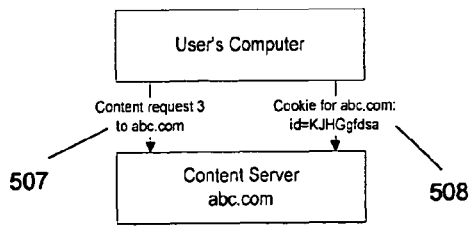
Figure 5F:
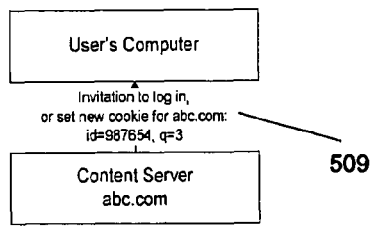
Figure 8A:
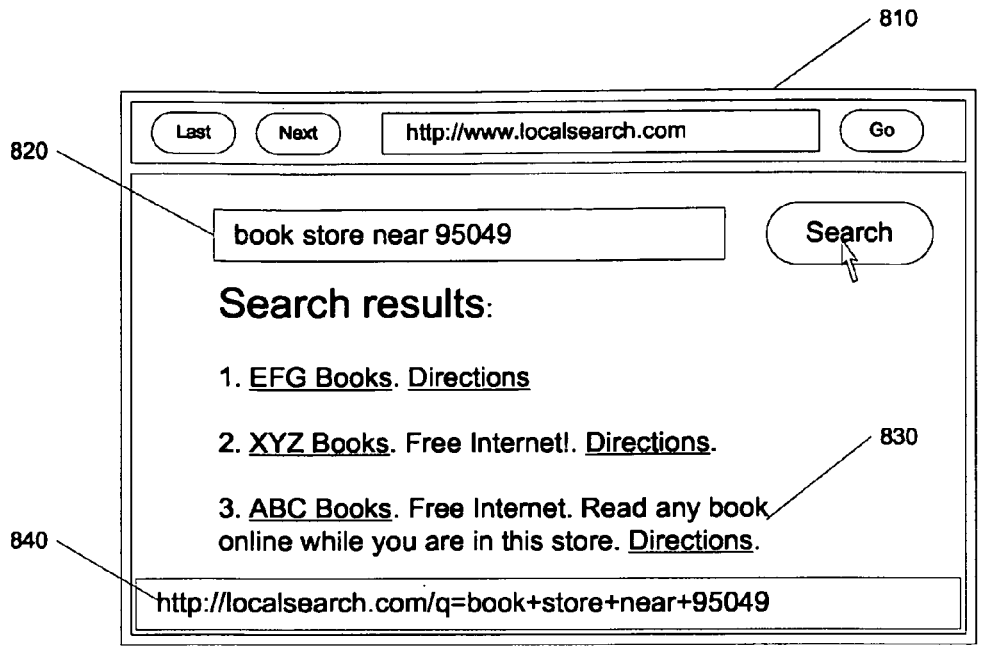
FIGS. 8a and 8b depict one embodiment of a novel sequence for enabling location-targeted service.
Figure 8B:
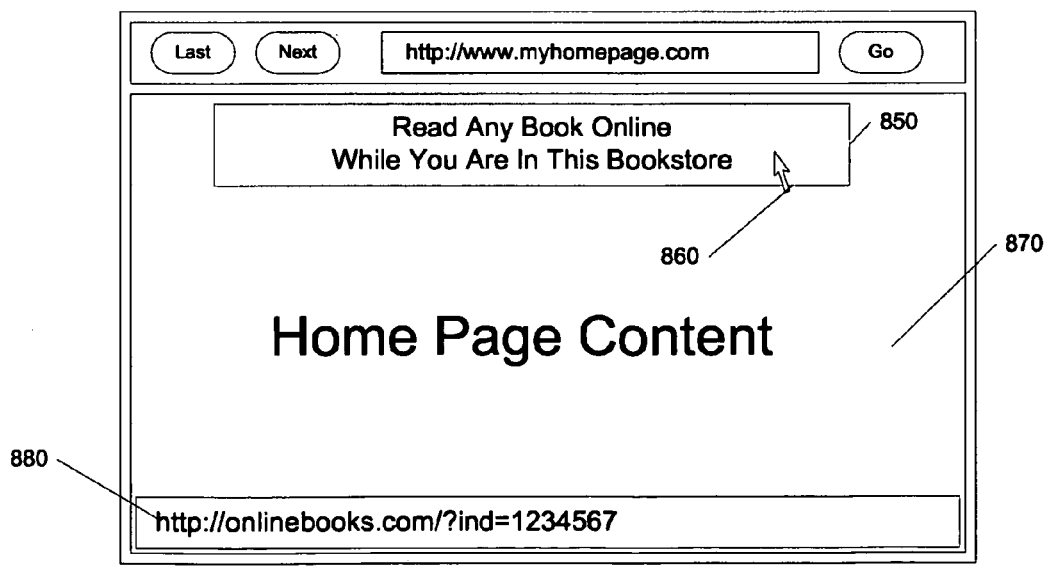
Figure 9A:
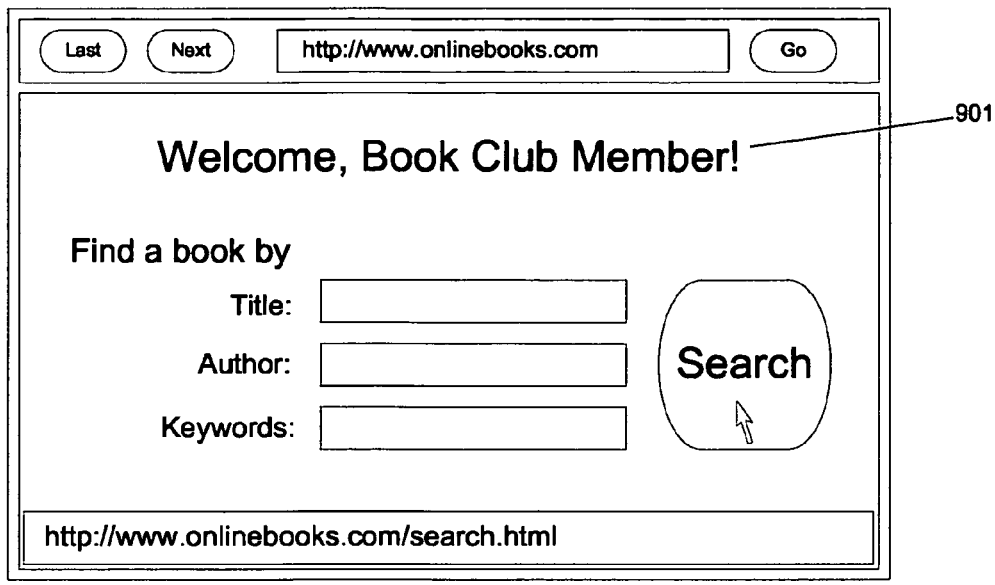
FIGS. 9a and 9b depict another embodiment of a novel sequence for enabling location-targeted service.
Figure 9B:

FIG. 3 shows another instance of the present invention by identifying the user by the originating IP address. In this case, the content server 301 has to be supplied with list of IP addresses corresponding to target locations; this list must be regularly updated. In comparison with location-specific links supported by the proxy server, this implementation requires additional support from a location-specific service.

In one other instance, the targeted location and the location-specific service may utilize fully authenticated exchange mechanisms, for instance by using Radius servers before the location-specific service is provided. In comparison with location-specific links supported by proxy server, this implementation requires additional support both from targeted location and from location-specific service Another embodiment of targeted services comprises location-specific cookies:

First, user's computer sends a request to fetch content from a content server. As part of the response, the content server sends a cookie to be stored on user's computer. However, this cookie is replaced by another one that hides at least part of the data the content server wanted to store on user's computer.

In one example, the content server sends a response to the proxy server which performs a cookie replacement and then sends a response with a replaced cookie to the user's computer. While the user is at the targeted location, this proxy server is responsible for forwarding all traffic between the user's computer and the remote content servers.

For instance, the user's computer may be wirelessly connected to a router that is running proxy software, or the user's computer may be connected to a wired local network that redirects all traffic through a remote proxy server. In both examples, the cookie on the user's computer is replaced only if the user receives a response from a content server while being connected through the proxy associated with the targeted location.

Cookie data can be hidden in 2 different ways:
  data sent by the content server is encrypted and then stored on the user's computer, or
  data sent by the content server is stored outside of the user's computer (for instance, in the indexed database table on a remote server), while only a pointer to that data is stored on the user's computer.

Then, after a modified cookie is stored on user's computer, the same computer issues another request to fetch content from the same content server, sending the stored cookie as part of the request.

If this request is forwarded through the proxy server associated with the targeted location, the proxy server replaces the cookie with the one containing data originally sent by the content server. The content server receives data previously sent to the user's computer, recognizes the user and serves the requested content. In this way, a user connected through the proxy and associated with the targeted location continues to interact with the content server as if content server cookies were stored without any modifications.

However, if the content server receives a content request accompanied by the cookie as it was stored on user's computer, it will not be able to understand the modified cookie. If the content server doesn't recognize the user, it may decline to provide the requested content until the user confirms his identity, or will fail to provide the personalized content. In this way, a user leaving the location associated with the proxy server that performed cookie modifications is prevented from receiving the same content, at least until performing the additional steps required to get accepted by the content server.

Cookie data can be restored in 2 different ways:
  encrypted data is decrypted before sending a request to the content server, or
  a pointer, such as a index stored on user computer, is used to retrieve data stored outside of the user's computer (for instance, on a remote server), and then pass the data to the content server.

FIGS. 4a-4f show one embodiment, where the user logs in 402, causing the server 401 to set an authorization cookie 403, encrypted by a proxy server 406 and stored on the user's computer 400. While the user continues to send requests through the proxy server, the cookie supplied with the next request is decrypted 404 before being sent to the content server 401. The content server responds with the requested content 405 and updates the cookie to reflect the user's browsing history 407. If the user issues another content request without assistance from the proxy server as shown in 408 (for instance, after leaving the targeted location), the cookie isn't decrypted, causing the encrypted cookie to be sent 409. The content server won't recognize the user and will either respond with a sign-in request or just re-starts collecting browsing history if the latest content request didn't require authorization 410.

FIGS. 5a-5f show another embodiment, where the cookie supplied by the content server is stored separately (for instance, on the remote server 502), while only the index referencing that storage 503 is sent to the user's computer 500. While the user continues to send requests through the proxy server 506, the cookie supplied with the next request is de-referenced from storage 504 before being sent to the content server; the content server 501 then responds with requested content, updating the cookie to reflect the user's browsing history 505. If the user issues another content request without assistance from the proxy server as shown in 507 (for instance, after leaving the targeted location), the cookie isn't de-referenced 508, the content server doesn't recognize the user and either responds with a sign-in request, or just re-starts collecting browsing history if latest content request didn't require authorization 509.

Examples of using location-specific cookies:

A. Location-specific service as described above: user continues to get recognized as a member while on targeted location, but this recognition ends as soon as user leaves the network associated with the proxy that modified the cookie.

When the user re-enters the same or a different location (for instance, another hotel in the same group) that knows how to restore data from the modified cookie, the user will get recognized again and can therefore continue to use the targeted service.

B. Location-specific user identity. Multiple sites and advertising networks try to track user's behavior through search requests, interest to specific products etc. While useful to for providing personalization and relevant advertisements, such tracking over the long period of time can violate user's privacy.

Location-specific cookies enable creating separate identities for targeted locations.

B1. In one implementation, a modification of the cookie sent by the content server includes changing both its name and its value. In the same implementation, the proxy server blocks every cookie that was not modified from reaching the content server.

While the user is at the targeted location, the content server doesn't have access to the old cookie and thus treats the user as a different identity. After the user leaves the targeted location, the content server starts receiving an old cookie, together with the one modified by the proxy server. While ignoring the modified cookie, the server now recognizes the user's identity from the old cookie and remembers actions performed before the user was at the targeted location.

When user enters a targeted location again, the process repeats itself: now the content server reads only modified cookies, reflecting only the user history at the targeted location. In this way, the user automatically switches identities while entering and leaving the targeted location. For instance, the user's browsing history while in the supported bookstore or hotel will not be correlated with the browsing history when the same notebook computer is connected to Internet at work.

B2. In another implementation, modification of the cookie sent by the content server includes changing only the cookie value; the cookie name remains the same.

In this case, the content server stops recognizing cookie value and forgets user history after the user leaves targeted location, effectively erasing the old user identity. If proxy server also blocks any unmodified cookies from reaching content server, previous identity is erased first on entering and then on leaving targeted location.

One other embodiment of targeted services comprises location-specific links.

In U.S. patent application Ser. No. 11/292,187, incorporated by reference, the user requests are re-directed to a partner web service. If the service provider's service isn't present, a click on the same leads directly to the target content server.

In contrast, a location-specific link leads to the intended content server only if a service provider's service is present; in absence of a service provider's service, a click on the same link doesn't reach its intended target.

To accomplish that, the URL associated with the link and referencing the network address of the specific content server is modified, so that additional assistance is required to uncover the hidden address of that server before content request can be sent to its intended destination.

In one implementation, this assistance is provided by a proxy server that forwards user requests to all content servers. For instance, the user's computer may be wirelessly connected to a router having running proxy software, or the user's computer may be connected to the wired local network that redirects all traffic through a remote proxy server.

If URL modification includes encrypting the address of the target content server, the proxy server decrypts this address for every request with encrypted URL and redirects it to the correct location.

Alternatively, correct addresses of the target server can be stored in a separate database, with the URL of the location-specific link containing an index referencing such database. In this instance, the proxy server uses this index to obtain correct address of the target content server and re-direct the user request to a correct destination.

In this way, a click on a location-specific link works as expected (fetches content from the target content server) only while the user requests are sent through the proxy server. If this proxy server is associated with a specific location (resides on a wireless router, or processes traffic re-directed from the local network), the location-specific links works only while user is at supported location.

In one implementation, the location-specific link stops working after the user leaves supported location, or switches to the network where traffic isn't forwarded through the decoding proxy. For instance, such an encoded link may point to an encrypted server name that doesn't correspond to any real network address.

FIGS. 6a-6c depict such an implementation, where a link on the user's computer 600 references a URL with an encrypted combination of the host name and a content path 602. After the user clicks on that link to request the content, the proxy server 606 decrypts both host name and path, resolves the decrypted host name (abc.com) to an IP address with help from the DNS server 603, adds the decrypted path (content.html) and sends a fully formed request to the content server 604, causing it to return the requested content 605.

If a user performs the same click outside of the location supported by the proxy server as shown in FIG. 6c, the encrypted URL is sent to the DNS server 607 which returns a "Server not found" error 608 and the link is disabled.

In another implementation, a click on a location-specific link performed outside of the supported location does send a request to the intended content server, but specifies a default or sign-up page (encoded location of the intended content is stored in the query, ignored by the content server). As a result, the user outside of a supported location may see, for instance, a sign-up page inviting to subscribe to the service, instead of requested content.

FIGS. 7a-7d depict an embodiment where the link stored on user's computer contains the correct content path, with only the query portion of the URL being hidden (references remote storage). This depiction, as well as the other figures except for FIGS. 6a-6c, omits the interaction with DNS servers in order to simplify the description. The proxy server 706 retrieves the correct query 702 from the storage 703 and sends a complete request 704 to the content server 701. The content server then returns content personalized for the user as identified by the query 705.

If the user performs the same click outside of the location supported by the proxy server as shown in FIG. 7c, a URL with a hidden query 707 is sent to the content server, which subsequently can't recognize the user (FIG. 7d) and thus returns generic (non-premium) content or an invitation to log in 708.

In an alternative implementation, the link is left unmodified, but the proxy server adds a cookie to the request with known URL in order to receive specific content. For instance, many sites perform an automatic login for recognized users: if an appropriate cookie is received, the user clicking on the same link is accepted as a member; if not, the user is presented with a login page. With an agreement from the location-specific service, the proxy server may pre-store an authorization cookie that belongs to a different user and supply it with a requested URL for that service.

Examples of using location-specific links:

A. Login-free access to a member-only service.

In one implementation, the user name and password are included into the URL: any person accessing that URL would be able to bypass the login process. However, the URL stored on user's computer is encrypted; it is converted to a form recognized by the content server by a remote proxy, outside of user's control.

For instance, an advertisement offers a no-login trial period while the user is at a targeted location. The user may click on the advertisement to bypass the login. However, if the user tries to bookmark the URL and use it outside that location, the same link will not work.

In another implementation, an encoded URL points to the page with the desired content (for instance, advertised movie), which can normally be reached only after logging in. A user clicking on the link causes the proxy server to decode the URL and to add a previously acquired cookie confirming that the user has a right to access desired content.

Such a cookie may be pre-stored on the remote server, for instance, by re-using a cookie first generated for another user.

B. Location-targeted product discount

In one implementation, the coupon code is included into the URL, which is stored in an encrypted form on the user's computer; access to that URL will automatically discount the price for the referenced product.

For instance, an advertisement offers to purchase an online product at a discount price, but only while the user is at specified location. If the user tries to bookmark the URL and use it outside that location, the same link will not work.

Yet one other embodiment of targeted services comprises location-targeted online services The main sequence of steps for location-targeted services is:

- while the user is outside of the targeted location, advertise the user's benefits if the online service or product is consumed from the targeted location. To differentiate from offers on the local sites (for instance, the login page of the hotel), the same service or product should be also available outside of targeted location, but on less favorable conditions.
- after the user enters the targeted location, provide the user with access to the advertised benefit.
- after the user leaves the targeted location, disable access to the advertised benefit, or ask the user to perform additional actions (sign in, etc.) to maintain the access.

FIGS. 8a, 8b, 9a and 9b depict one embodiment of this sequence.

While outside of the targeted location (FIG. 8a), the user opens the browser window 810 and searches for the nearest book store (input field 820, search query 840). The resulting search results contain a list of descriptions of nearest book stores with at least some descriptions being provided by the stores themselves to entice users to visit targeted locations. For instance, XYZ Books (search result 2) advertises availability of the free Internet access. However, ABC Books 830 promises not only free Internet access, but also ability to freely browse premium or restricted content (online books) during the visit to the store.

The user then visits the store that provides the best incentive, and opens the browser window while using the local Internet connection (FIG. 8b) and downloads the main content 870 together with the link that enables the user to access the promised premium content. In the depicted embodiment, such a link is presented as part of the advertisement 850, which can be either embedded into the main content 870 or added to it by the proxy server. Such a proxy server can be, for instance, installed on a wireless router serving the current location.

Alternatively, such a link can be integrated with the main document, for instance as being a part of the bookstore's web site.

The user can observe the URL referenced by the link in the status bar 880, but this URL will work only while the user is at the specified location.

If the user positions the cursor 860 over the link associated with location-targeted service and then performs a click, the requested content is presented immediately (FIG. 9a), without any additional steps. While the user is on location, he can continue to browse offered content 901.

If user attempts to access the same service after leaving the location (FIG. 9b), he is presented with a request to become a member 902, which requires the user to provide additional information that can be used for marketing purposes, or pay for subscription.

The depicted embodiment combines the location-specific membership (different requirements to become a member depending on location), the location-specific cookie (user can continue browsing while on location, but not after leaving the location) and the location-specific links (even if user bookmarks the link, it will not work outside the location).

However, the location-targeted online services do not depend on any of these features.

In an alternative embodiment that doesn't rely on location-specific cookies or links, the location-targeted service this sequence creates is a customized web site and provides it to the location owner for storage on the local network. For example, the online retailer may create a custom page with selected products at discount prices, to be stored on the local server at the targeted location. The users will see that page only while on the targeted location, but will still be able to purchase the same products, albeit without a discount, from the main site of the same retailer.

The main differentiator of the location-targeted service from the advertisement selectively shown at specific location is the fact that the user benefit (one-click membership, exclusive product discounts, etc.) is advertised before the user enters the location, so that user is given an additional incentive to visit the location.

In another implementation, access to premium content can be granted even after the user leaves the targeted location. This is achieved through the use of authorized software related to the target location that grants the user access to the proxy server. The proxy server can grant the connection based on authorization protocols utilized by the software such as a Virtualized Private Network (VPN) or the like. Once the proxy server recognizes the software, the proxy server can process requests for premium content as illustrated in the previous embodiments. Moreover, this allows the user to take advantage of other access points to the internet besides the ones related to the targeted location. For example, a hotel patron who wishes to access premium content in a caf outside of the hotel may utilize the hotel's authorized software to access the proxy server, despite the user's utilization of the caf's access point. The authorized software can utilize a subscription based service or can be effective for a certain period of time (for example, the proxy server only authorizes the software for the duration of a patron's stay in a hotel).

Figure 10:
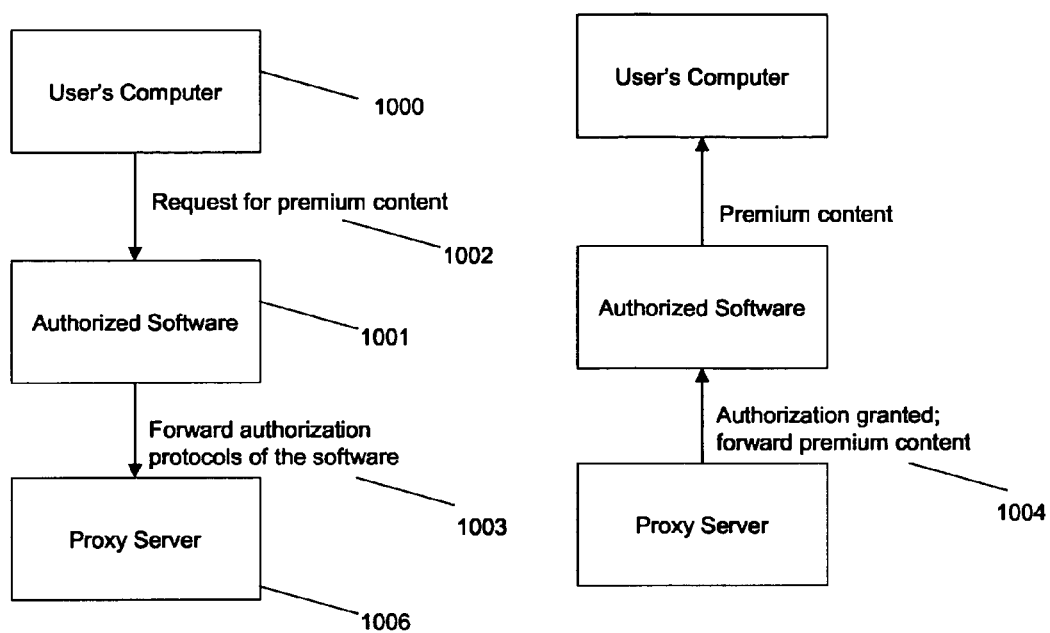
FIG. 10 depicts one novel implementation of allowing the user access to premium content even if the user is outside of the targeted location.

FIG. 10 illustrates an example of this implementation.

While outside of the targeted location, the user computer 1000 utilizes the authorization software 1001 and requests premium content 1002. The authorization software forwards its authorization protocols 1003 to the proxy server 1006. If the authorization protocols are accepted, the proxy server will serve premium content back to the user computer, utilizing the previously described embodiments to do so. If the authorization protocols aren't accepted (due to the user attempting to access the proxy server without the authorization software and without utilizing the service provider of the target location, or due to the lapse of the authorization software, for example), the proxy server will reject the incoming connection and will not deliver the premium content.

Figure 11:
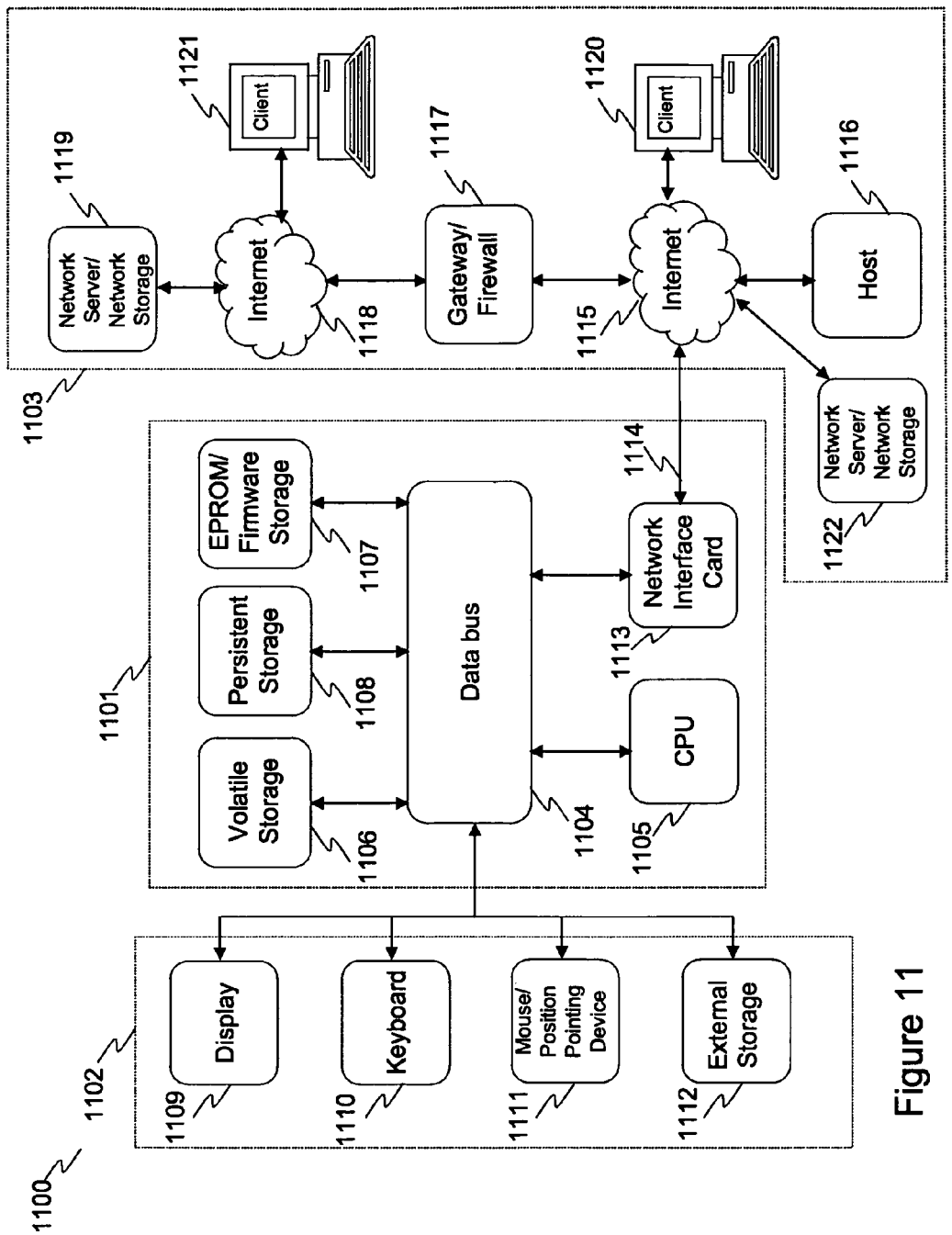
FIG. 11 illustrates an exemplary embodiment of a computer platform upon which the inventive system may be implemented.

FIG. 11 is a block diagram that illustrates an embodiment of a computer/server system 1100 upon which an embodiment of the inventive methodology may be implemented. The system 1100 includes a computer/server platform 1101, peripheral devices 1102 and network resources 1103.

The computer platform 1101 may include a data bus 1104 or other communication mechanism for communicating information across and among various parts of the computer platform 1101, and a processor 1105 coupled with bus 1101 for processing information and performing other computational and control tasks. Computer platform 1101 also includes a volatile storage 1106, such as a random access memory (RAM) or other dynamic storage device, coupled to bus 1104 for storing various information as well as instructions to be executed by processor 1105. The volatile storage 1106 also may be used for storing temporary variables or other intermediate information during execution of instructions by processor 1105. Computer platform 1101 may further include a read only memory (ROM or EPROM) 1107 or other static storage device coupled to bus 1104 for storing static information and instructions for processor 1105, such as basic input-output system (BIOS), as well as various system configuration parameters. A persistent storage device 1108, such as a magnetic disk, optical disk, or solid-state flash memory device is provided and coupled to bus 1101 for storing information and instructions.

Computer platform 1101 may be coupled via bus 1104 to a display 1109, such as a cathode ray tube (CRT), plasma display, or a liquid crystal display (LCD), for displaying information to a system administrator or user of the computer platform 1101. An input device 1110, including alphanumeric and other keys, is coupled to bus 1101 for communicating information and command selections to processor 1105. Another type of user input device is cursor control device 1111, such as a mouse, a trackball, or cursor direction keys for communicating direction information and command selections to processor 1104 and for controlling cursor movement on display 1109. This input device typically has two degrees of freedom in two axes, a first axis (e.g., x) and a second axis (e.g., y), that allows the device to specify positions in a plane.

An external storage device 1112 may be connected to the computer platform 1101 via bus 1104 to provide an extra or removable storage capacity for the computer platform 1101. In an embodiment of the computer system 1100, the external removable storage device 1112 may be used to facilitate exchange of data with other computer systems.

The invention is related to the use of computer system 1100 for implementing the techniques described herein. In an embodiment, the inventive system may reside on a machine such as computer platform 1101. According to one embodiment of the invention, the techniques described herein are performed by computer system 1100 in response to processor 1105 executing one or more sequences of one or more instructions contained in the volatile memory 1106. Such instructions may be read into volatile memory 1106 from another computer-readable medium, such as persistent storage device 1108. Execution of the sequences of instructions contained in the volatile memory 1106 causes processor 1105 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1105 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1108. Volatile media includes dynamic memory, such as volatile storage 1106. Transmission media includes coaxial cables, copper wire and fiber optics, including the wires that comprise data bus 1104.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1105 for execution. For example, the instructions may initially be carried on a magnetic disk from a remote computer. Alternatively, a remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on the data bus 1104. The bus 1104 carries the data to the volatile storage 1106, from which processor 1105 retrieves and executes the instructions. The instructions received by the volatile memory 1106 may optionally be stored on persistent storage device 1108 either before or after execution by processor 1105. The instructions may also be downloaded into the computer platform 1101 via Internet using a variety of network data communication protocols well known in the art.

The computer platform 1101 also includes a communication interface, such as network interface card 1113 coupled to the data bus 1104. Communication interface 1113 provides a two-way data communication coupling to a network link 1114 that is connected to a local network 1115. For example, communication interface 1113 may be an integrated services digital network (ISDN) card or a modem to provide a data communication connection to a corresponding type of telephone line. As another example, communication interface 1113 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1113 sends and receives electrical, electromagnetic or optical signals that carry digital data streams representing various types of information.

Network link 1113 typically provides data communication through one or more networks to other network resources. For example, network link 1114 may provide a connection through local network 1115 to a host computer 1116, or a network storage/server 1117. Additionally or alternatively, the network link 1113 may connect through gateway/firewall 1117 to the wide-area or global network 1118, such as an Internet. Thus, the computer platform 1101 can access network resources located anywhere on the Internet 1118, such as a remote network storage/server 1119. On the other hand, the computer platform 1101 may also be accessed by clients located anywhere on the local area network 1115 and/or the Internet 1118. The network clients 1120 and 1121 may themselves be implemented based on the computer platform similar to the platform 1101.

Local network 1115 and the Internet 1118 both use electrical, electromagnetic or optical signals that carry digital data streams. The signals through the various networks and the signals on network link 1114 and through communication interface 1113, which carry the digital data to and from computer platform 1101, are exemplary forms of carrier waves transporting the information.

Computer platform 1101 can send messages and receive data, including program code, through the variety of network (s) including Internet 1118 and LAN 1115, network link 1114 and communication interface 1113. In the Internet example, when the system 1101 acts as a network server, it might transmit a requested code or data for an application program running on client(s) 1120 and/or 1121 through Internet 1118, gateway/firewall 1117, local area network 1115 and communication interface 1113. Similarly, it may receive code from other network resources.

The received code may be executed by processor 1105 as it is received, and/or stored in persistent or volatile storage devices 1108 and 1106, respectively, or other non-volatile storage for later execution. In this manner, computer system 1101 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A system for accessing premium content, the system comprising at least one central processing unit, at least one memory unit, at least one data storage unit and at least one network interface unit, the system further comprising:
   a user computer initiating a request for premium content
   a proxy server:
      obtaining an authorization cookie from outside of the user computer;
      appending the authorization cookie to the request for premium content; and
      forwarding the request for premium content;
   a content server receiving the forwarded request and returning premium content upon detecting the appended authorization cookie,
   wherein the content server responds with a cookie upon receiving the forwarded request, and wherein the proxy server further stores the cookie from the content server outside of the user computer;
   wherein a pointer to the cookie from the content server is stored on the user computer, the request for the premium content sent from the user computer contains said pointer and wherein the proxy server dereferences the pointer to retrieve the stored cookie from outside of the user computer and appends the stored cookie to a request for premium content.

2. The system of claim 1, wherein the proxy server is further forwards an IP address to the content server, and wherein the content server returns premium content if the IP address corresponds to a targeted location.

3. The system of claim 1, wherein the content server returns a request for a login and password if no valid authorization cookie is received with the request for premium content.

4. The system of claim 1, further comprising authorization software to connect the user computer to the proxy server.

5. A system for accessing premium content, the system comprising at least one central processing unit, at least one memory unit, at least one data storage unit and at least one network interface unit, the system further comprising:
   a user computer initiating a request for premium content from a content server, said request comprising a first cookie, with said first cookie being different from an authorization cookie required to retrieve requested content;
   a proxy server:
      modifying the first cookie to produce the authorization cookie,
      appending the authorization cookie to the request for premium content; and
      forwarding the request for premium content;
   a content server receiving the forwarded request and returning premium content upon processing the appended authorization cookie,
   wherein the content server responds with a cookie upon receiving the forwarded request, and wherein the proxy server further stores the cookie from the content server outside of the user computer;
   wherein a pointer to the cookie from the content server is stored on the user computer, the request for the premium content sent from the user computer contains said pointer and wherein the proxy server dereferences the pointer to retrieve the stored cookie from outside of the user computer and appends the stored cookie to a request for premium content.

6. The system of claim 5, wherein modifying the first cookie further comprises decrypting the first cookie to produce the authorization cookie.

7. The system of claim 5, wherein the content server responds with a cookie upon receiving a request from the user's computer, and wherein the proxy server further encrypts said cookie from the content server and stores the encrypted cookie on the user computer.

8. The system of claim 1, further comprising authorization software to connect the user computer to the proxy server.

9. A system for accessing premium content, the system comprising at least one central processing unit, at least one memory unit, at least one data storage unit and at least one network interface unit, the system further comprising:
   a user computer initiating a request for premium content which is redirected to a partner web service, wherein the partner web service modifies request for premium content by using a modified universal resource locator (URL);
   a content server comprising premium content;
   a proxy server
      processing the modified URL into a URL associated with the content server;
      redirecting the user computer to the content server using the URL associated with the content server; and
      retrieving premium content,
   wherein the content server responds with a cookie upon receiving the request for premium content, and wherein the proxy server further stores the cookie from the content server outside of the user computer;
   wherein a pointer to the cookie from the content server is stored on the user computer, the request for the premium content sent from the user computer contains said pointer and wherein the proxy server dereferences the pointer to retrieve the stored cookie from outside of the user computer and appends the stored cookie to a request for premium content.

10. The system of claim 9, wherein the modified URL link is encrypted and wherein the proxy server processes the modified URL by decrypting the encrypted URL to determine the URL associated with the content server.

11. The system of claim 9, wherein URL associated with a content server are stored in a database, and wherein the modified URL contains an index referencing the database, and wherein the proxy server uses the index to determine the URL associated with the content server.

12. The system of claim 9, wherein the modified URL has a modified query portion, and wherein the modified URL is stored onto the user computer.

13. The system of claim 12, wherein the proxy server retrieves a query based on the modified query to determine the URL associated with the content server.

14. The system of claim 10, wherein decrypting the URL further comprises decrypting a user name and password contained in the URL, thereby allowing a user to bypass a login page on the content server.

15. The system of claim 9, wherein the proxy server further forwards an authorization cookie to the content server.

16. The system of claim 9, further comprising authorization software connecting the user computer to the proxy server.

17. A system for accessing premium content, the system comprising at least one central processing unit, at least one memory unit, at least one data storage unit and at least one network interface unit, the system further comprising:
   a user computer initiating a request for premium content, said request containing a first universal resource locator (URL) comprising a host and a query portion, the host portion being the same as the host portion of URL of the content server;
   a proxy server:
      modifying the query portion of the first URL;
      appending the modified query portion to the host portion of the first URL to produce a second URL comprising a location identifier addressing the requested premium content; and
      processing the modified URL into a URL associated with the content server;
      redirecting the user computer to the content server using the URL associated with the content server; and
      requesting the premium content referenced by the second URL;
   a content receiving the request and returning premium content from the location addressed by the second URL;
   wherein the content server responds with a cookie upon receiving the request for premium content, and wherein the proxy server further stores the cookie from the content server outside of the user computer;
   wherein a pointer to the cookie from the content server is stored on the user computer, the request for the premium content sent from the user computer contains said pointer and wherein the proxy server dereferences the pointer to retrieve the stored cookie from outside of the user computer and appends the stored cookie to a request for premium content.

18. The system of claim 17, wherein the query portion of the first URL is encrypted and stored on user computer together with an unmodified host portion, and modifying the query comprises decrypting the query portion to produce the second URL.

19. The system of claim 17, wherein a query portion of the second URL is stored in a database outside of the user computer, and wherein the query portion of the first URL contains an index referencing the database, and wherein the proxy server uses the index to determine the query portion of the second URL.

* * * * *